United States Patent [19]

Aoyama et al.

[11] Patent Number: 4,713,296

[45] Date of Patent: Dec. 15, 1987

[54] LAMINATE HAVING GOOD GAS BARRIER PROPERTIES WITH BARRIER LAYER OF MODIFIED ETHYLENE-VINYL ALCOHOL COPOLYMER

[75] Inventors: Akimasa Aoyama; Takeshi Moritani; Kiyoshi Yonezu; Taichi Negi, all of Kurashiki; Takuji Okaya, Nagaokakyo, all of Japan

[73] Assignee: Kuraray Co., Ltd., Kurashiki, Japan

[21] Appl. No.: 873,413

[22] Filed: Jun. 12, 1986

[30] Foreign Application Priority Data

Jun. 29, 1985 [JP] Japan ................... 60-140909

[51] Int. Cl.$^4$ ................ B32B 27/32; B32B 27/08; B29C 47/00; B65D 85/00
[52] U.S. Cl. ................... 428/412; 428/35; 428/483; 428/476.1; 428/516; 428/518; 264/176.1; 264/535; 525/61; 426/127
[58] Field of Search ............... 428/516, 483, 476.1, 428/518, 412, 520; 525/60, 61

[56] References Cited

U.S. PATENT DOCUMENTS

| | | | |
|---|---|---|---|
| 4,058,647 | 11/1977 | Inoue et al. | 428/522 |
| 4,289,830 | 9/1981 | Knott, II | 428/516 |
| 4,495,249 | 1/1985 | Ohya et al. | 428/516 |

FOREIGN PATENT DOCUMENTS

| | | | |
|---|---|---|---|
| 0115163 | 8/1984 | European Pat. Off. | 428/516 |
| 4006192 | 2/1974 | Japan | 428/516 |

*Primary Examiner*—P. C. Ives
*Attorney, Agent, or Firm*—Kramer, Brufsky & Cifelli

[57] ABSTRACT

There is provided a laminate having good gas barrier properties which comprises at least one barrier layer of modified ethylene-vinyl alcohol copolymer containing 0.1 to 5 mol % of pyrrolidone ring-containing units and 20 to 55 mol % of ethylene units, with the degree of saponification of the vinyl acetate component being at least 98 mol %, and at least one layer of thermoplastic resin. This laminate is superior in drawability, and can be made by drawing into bottles, cups, and the like which exhibit excellent clarity, appearance, and gas barrier properties.

5 Claims, No Drawings

LAMINATE HAVING GOOD GAS BARRIER PROPERTIES WITH BARRIER LAYER OF MODIFIED ETHYLENE-VINYL ALCOHOL COPOLYMER

BACKGROUND OF THE INVENTION

1. Field of the Invention

The present invention relates to a laminate superior in formability, especially drawability, and gas barrier properties.

2. Description of the Prior Art

Among many thermoplastic resins capable of melt forming, ethylene-vinyl alcohol copolymer (referred to as EVOH hereinafter) is noted for its gas barrier properties, oil resistance, and solvent resistance. It has found use as film, sheet, containers, etc. in the area of packaging, especially food packaging.

EVOH resin, however, has some disadvantages. As compared with other thermoplastic resins such as polyolefins, it is poor in formability, especially drawability, and it easily suffers cracking and uneven stretching when it undergoes plastic working such as deep draw, air-pressure forming, plug-assist forming, and stretch blow molding. In addition, it is liable to exhibit uneven clarity after forming.

To meet the recent requirements for sophisticated performance of packaging materials, an EVOH resin is often used in combination with other resins such as polyethylene, polypropylene, and polystyrene in the form of a laminate. In this case, an EVOH resin constitutes an interlayer of a multi-layer laminate and imparts improved physical properties to the laminate. The laminate is required to be capable of being pressure formed at a draw ratio of 0.5 to 3. This requirement, however, is not satisfied with an EVOH resin containing ethylene in the range of 25 to 45 mol%, especially 25 to 40 mol%, which is the best range for obtaining good gas barrier properties. The requirement is satisfied only at a sacrifice of the gas barrier properties with an EVOH resin containing more than 40 mol%, especially more than 45 mol% of ethylene.

EVOH film also has disadvantages when it is stretched in the form of a single film or a laminated film with other thermoplastic resins. In the case of EVOH film containing ethylene in the desired range of 25 to 40 mol%, it cannot be biaxially oriented satisfactorily unless it is properly moisturized. (See Japanese Patent Laid-open Nos. 14476/1975, 15570/1977, and 30670/1978.) Where EVOH is used as an interlayer of a multi-layer laminate or as a layer of a double-layer laminate, the EVOH layer easily suffers cracking and uneven stretching, as in the case of deep draw and stretch blow molding, if it is oriented, especially biaxially, in a substantially water-free state.

On the other hand, several methods have been proposed for improving the melt forming performance of EVOH. According to Japanese Patent Laid-open No. 20976/1983, two kinds of EVOH resins which differ in ethylene content and composition are compounded together and the resulting compound is formed into films, sheets, and containers. According to Japanese Patent Laid-open Nos. 129035/1983 and 154755/1983, EVOH is blended with nylon. In the former case, the melt forming performance is improved to some extent but the resulting formed parts are not satisfactory with respect to clarity. In the latter case, blending with nylon, which is poor in gas barrier properties, impairs EVOH's good gas barrier properties, and the resulting blend is poor in thermal stability and forms gels at the time of melt forming. (Presumably, the gels are reaction products of EVOH and nylon.)

In order to provide a food packaging material superior in formability, there was proposed in Japanese Patent Laid-open No. 8125/1982 an EVOH resin modified with an α-olefin represented by propylene. The modified resin, however, is not yet put to practical use because of insufficient gas barrier properties, although there is some improvement in formability and clarity of formed parts.

SUMMARY OF THE INVENTION

It is an object of the present invention to provide a laminate which is free from the above-mentioned disadvantages and is superior in formability, drawability, and gas barrier properties and is capable of being formed into highly transparent products without cracking and uneven drawing.

As the result of extensive studies, the present inventors found that a laminate composed of at least one layer of a saponified product of a terpolymer containing specific amounts of pyrrolidone ring-containing units, ethylene units, and vinyl acetate units and at least one layer of thermoplastic resin results in a greatly improved laminate over the conventional laminate of EVOH resin. The laminate exhibits good formability, clarity, appearance, and gas barrier properties, and it is suitable for food packaging. The present invention was completed on the basis of this finding.

The saponified product of a terpolymer containing specific amounts of pyrrolidone ring-containing units, ethylene units, and vinyl acetate units has the following advantages. It can be made into a multi-layer laminate sheet or pipe by coextrusion or any other means with a thermoplastic resin. The laminate sheet can undergo deep draw by air-pressure forming or the like, and the laminate pipe can undergo blow molding, without cracking and uneven stretching. In other words, the saponified product is extremely good in stretchability. The laminate containing the saponified product has good gas barrier properties, retention of aroma, oil resistance, and mechanical properties which are comparable to those of the laminate containing the conventional EVOH resin. The laminate is useful for fabricating films, sheets, and containers for packaging, especially food packaging.

DESCRIPTION OF THE PREFERRED EMBODIMENTS

According to this invention, the laminate exhibiting good gas barrier properties is composed of at least two layers, one layer being modified ethylene-vinyl alcohol and the other layer being a thermoplastic resin. The modified ethylene-vinyl alcohol copolymer is a saponified product of pyrrolidone ring containing ethylene-vinyl acetate copolymer, having a pyrrolidone ring-containing unit of 0.01 to 5 mol %, an ethylene unit of 20 to 55 mol % and a degree of saponification of the vinyl acetate component of at least 98 mol %.

It is characterized by the degree of saponification of the vinyl acetate units which is greater than 98 mol% and also by the intrinsic viscosity which is in the range of 0.07 to 0.17 1/g when measured in a mixed solvent composed of 85 wt% of phenol and 15 wt% of water at 30° C.

The modified ethylene-vinyl alcohol copolymer should contain pyrrolidone ring-containing units in an amount of 0.1 to 5 mol%, preferably 0.5 to 3 mol%. Employing less than 0.1 mol% does not provide highly transparent, esthetic formed parts free of cracking and uneven drawing due to an insufficient improvement in formability, especially drawability. Employing more than 5 mol%, results in poor thermal stability and gelation may occur at the time of melt forming. In addition, the laminate formed therewith exhibits reduced water resistance and moisture resistance, which lead to poor gas barrier properties under high-humidity conditions.

The modified ethylene-vinyl alcohol copolymer should contain ethylene units in an amount of 20 to 55 mol%, preferably 25 to 50 mol%. Employing less than 20 mol%, results in low water resistance and moisture resistance, which lead to poor gas barrier properties under high-humidity conditions. Employing more than 55 mol%, results in poor gas barrier properties under low-humidity conditions, although exhibiting an improvement in water resistance and moisture resistance. In either case, the laminate is inadequate for packaging, especially food packaging.

The vinyl acetate component in the modified ethylene-vinyl alcohol copolymer should have a degree of saponification of at least 98 mol%, preferably greater than 99 mol%. With less than 98 mol%, the copolymer exhibits reduced thermal stability and gelation may occur at the time of melt forming. In addition, it also exhibits poor gas barrier properties.

The copolymer should have an intrinsic viscosity in the range of 0.07 to 0.17 l/g as measured in a mixed solvent composed of 85 wt% of phenol and 15 wt% of water at 30° C. With an intrinsic viscosity lower than 0.07 l/g, the copolymer exhibits poor mechanical properties; and with an intrinsic viscosity higher than 0.17 l/g, the copolymer may gel at the time of melt forming.

The saponified product of the terpolymer comprising pyrrolidone ring-containing units, ethylene units, and vinyl acetate units can be commercially produced by known processes. First a pyrrolidone ring-containing monomer, ethylene, and vinyl acetate are copolymerized by using a radical polymerization initiator such as α,α'-azobisisobutyronitrile in the presence or absence of alcohol, such as methanol. Then, the resulting copolymer is saponified in alcohol containing an alkaline catalyst, such as sodium hydroxide. A suitable pyrrolidone ring-containing monomer is N-vinyl-2-pyrrolidone or a derivative thereof, the former being economically preferable.

The thermoplastic resin to be laminated with the above-mentioned copolymer includes polypropylene, polyethylene, ethylene-propylene copolymer, ethylene-vinyl acetate copolymer, thermoplastic polyester (e.g., polyethylene terephthalate), polyamide resins (e.g., 6-nylon and 6,6-nylon), polystyrene, polyvinyl chloride, and polycarbonate. Preferable thermoplastic resins are polypropylene, polyethylene, ethylene-propylene copolymer, thermoplastic polyester, and polystyrene.

The laminate of this invention is composed of at least two layers. One layer is made of a copolymer obtained by saponifying the above-mentioned terpolymer comprising pyrrolidone ring-containing units, ethylene units, and vinyl acetate units. The other layer is made of a thermoplastic resin: The laminate may have the following structure. Copolymer/thermoplastic resin, thermoplastic resin/copolymer/thermoplastic resin, and thermoplastic resin/copolymer/thermoplastic resin/copolymer/thermoplastic resin. The layer of thermoplastic resin may be single or multiple.

The laminate may be formed by any known method such as coextrusion, coinjection, extrusion lamination, and coating (i.e. coating the layer of thermoplastic resin with the copolymer solution or coating the layer of copolymer with the thermoplastic resin solution). In the case of coextrusions, two extruders are used, one for the saponified product of the terpolymer comprising pyrrolidone ring-containing units, ethylene units, and vinyl acetate units, and the other for the thermoplastic resin. The extrudates from the two extruders are combined together in a coextrusion die (T-die or inflation die) which forms a laminate.

The laminate produced as mentioned above is by far better in draw forming performance than the laminate containing the conventional EVOH resin layer. When subjected to deep draw forming or stretch blow molding, it provides formed parts exhibiting very high clarity and good gas barrier properties, without cracking and uneven stretching in the copolymer layer.

The laminate of this invention (in the form of film, sheet, tube, pipe or parison) may be used as a raw material for a laminate film (oriented in at least one direction), deep-drawn containers, and stretch-blown containers. It is particularly useful as a raw material for deep-drawn containers to be formed at a draw ratio greater than 0.5, especially in the range of 0.8 to 3. Deep-drawn containers such as cuplike containers are produced by draw forming, air-pressure forming, vacuum forming, or plug-assist forming at a stretching temperature of the laminate. Stretch blown bottles are produced by mechanically stretching a performance (e.g., parison made from the laminate) at a stretching temperature and simultaneously blowing a fluid for expansion in the peripheral direction.

The copolymer layer in the laminate should have a thickness in the range of 2 to 40 μm, depending on the performance required for the deep drawn containers and the stretch blown bottles. The layers constituting the laminate of this invention should be bonded to one another with the aid of an adhesive resin. The adhesive resin is not specifically limited; but preferred examples include carboxyl-modified products of ethylene-vinyl acetate copolymer, polypropylene, and ethylene-acrylate ester copolymer. The one modified with maleic anhydride may be suitably used as such or in the form of blend with an unmodified polymer.

The invention is now described in more detail with reference to the following examples, which are not intended to limit the scope of the invention.

EXAMPLE 1

An N-vinyl-2-pyrrolidone-ethylene-vinyl acetate copolymer composed of 1.1 mol% of N-vinyl-2-pyrrolidone, 34.3 mol% of ethylene, and 64.6 mol% of vinyl acetate was saponified in methanol containing sodium hydroxide as a catalyst. The degree of saponification of the vinyl acetate component was 99.4 mol%. (The saponified product is designated as copolymer A hereinafter.) Copolymer A had an intrinsic viscosity (abbreviated as [η]ph hereinafter) of 0.108 l/g as measured in a mixed solvent composed of 85 wt% of phenol and 15 wt% of water at 30° C. Copolymer A also had a melt index (at 190° C. under a load of 2160 g) of 2.3 g/10 minutes.

A five-layer laminate containing copolymer A and two thermoplastic resins was produced in the following manner. (The laminate construction is: polypropylene layer, adhesive resin layer, copolymer A layer, adhesive resin layer, and polypropylene layer arranged in the order mentioned. The laminate is 200 mm wide and 1.1 mm thick.)

Apparatus:

(1) An extruder equipped with a full-flighted screw, 65 mm in diameter and 1430 mm in effective length, and a branched melt channel. This extruder produces the outer layers. Extrusion temperature: 180°–225° C.

(2) An extruder equipped with a full-flighted screw, 50 mm in diameter and 1100 mm in effective length. This extruder produces the interlayer. Extrusion temperature: 200°–240° C.

(3) An extruder equipped with a full-lighted screw, 40 mm in diameter and 880 mm in effective length, and a branched melt channel. This extruder produces the adhesive layers. Extrusion temperature: 160°–240° C.

(4) A T-die for five-layer coextrusion. Die temperature: 240° C.

Materials:

(1) The interlayer was made of copolymer A.

(2) The outer layers were made of polypropylene ("Mitsubishi Noblen MA6", a product of Mitsubishi Petrochemical Co., Ltd.) having a melt index of 1.4 g/10 min (at 230° C. under a load of 2160 g). (3) The adhesive layers were made of maleic anhydride-modified polypropylene ("Admer QF500", a product of Mitsui Petrochemical Co., Ltd.) having a melt index of 3.8 g/10 min (at 230° C. under a load of 2160 g).

melt index of 2.2 g/10 min (at 190° C. under a load of 2160 g). The degree of saponification of the vinyl acetate component is 99.5 mol%.

In comparative example 2, the interlayer was produced from propylene-modified EVOH (copolymer C), which is a saponified product of propylene-ethylene-vinyl acetate copolymer containing 1.2 mol% of propylene, 34.2 mol% of ethylene and 64.6 mol% of vinyl acetate. Copolymer C has an $[\eta]ph$ of 0.105 l/g and a melt index of 3.0 g/10 min (at 190° C. under a load of 2160 g). The degree of saponification of the vinyl acetate component is 99.3 mol%.

In comparative example 3, the interlayer was produced from blended EVOH (polymer D), which is a mixture of 60 parts by weight of a first EVOH and 40 parts by weight of a second EVOH. The first EVOH is a saponified product of ethylene-vinyl acetate copolymer containing 31.0 mol% of ethylene and 69.0 mol% of vinyl acetate. The first EVOH has an $[\eta]ph$ of 0.118 l/g and a melt index of 1.2 g/10 min (at 190° C. under a load of 2160 g). The degree of saponification of the vinyl acetate component is 99.3 mol%. The second EVOH is a saponified product of ethylene-vinyl acetate copolymer containing 40.4 mol% of ethylene and 59.6 mol% of vinyl acetate. The second EVOH has an $[\eta]ph$ of 0.097 l/g and a melt index of 5.9 g/10 min (at 190° C. under a load of 2160 g). The degree of saponification of the vinyl asetate component is 99.6 mol%.

The properties of the cups produced in the comparative examples are also shown in Table 1.

TABLE 1

| Example | Resin for interlayer | Appearance of interlayer | | | $O_2$ permeability $(cc/m^2 \cdot 24\ h \cdot atm)$ | |
|---|---|---|---|---|---|---|
| | | Clarity | Cracks | Stretching | 65% RH | 85% RH |
| Example 1 | Copolymer A | o | o | o | 0.41 | 1.6 |
| Comparative Example 1 | Copolymer B | x | x | x | 0.50 | 1.9 |
| Comparative Example 2 | Copolymer C | Δ | Δ | Δ | 0.80 | 2.5 |
| Comparative Example 3 | Copolymer D | x | x | Δ | 0.51 | 1.8 |

Note 1 Clarity:
o Good clarity without haze.
Δ With slight haze.
x Poor clarity with haze.
Note 2 Cracks:
o No cracks at all.
Δ Some cracks (1 to 5 cracks/cm$^2$).
x Many cracks (more than 6 cracks/cm$^2$).
Note 3 Stretching:
o Even stretching.
Δ Slightly uneven stretching.
x Severely uneven stretching.
Note 4 Oxygen permeability:
Measured after conditioning at 20° C. and specified relative humidity.

The resulting laminate sheet was made into a cylindrical cup, 100 mm in inside diameter (D), 200 mm in depth (L) (the draw ratio L/D=2), 0.5 mm in wall thickness, and 1.6 liters in volume, by air-pressure forming in solid phase under the condition that heats the sheet surface to 120° C. The ratio of the thicknesses of the outer layer:adhesive layer:interlayer:adhesive layer:internal layer was 45:2.5:5:2.5:45. The properties of the cup are shown in Table 1.

For comparison, cylindrical cups were produced in the same manner as mentioned above from different materials.

In comparative example 1, the interlayer was produced from EVOH (copolymer B), which is a saponified product of ethylene-vinyl acetate copolymer containing 34.2 mol% of ethylene and 65.8 mol% of vinyl acetate. Copolymer B has an $[\eta]ph$ of 0.110 l/g and a

EXAMPLE 2

An N-vinyl-2-pyrrolidone-ethylene-vinyl acetate copolymer composed of 2.0 mol% of N-vinyl-2-pyrrolidone, 42.4 mol% of ethylene, and 55.6 mol% of vinyl acetate was saponified to give a copolymer (Copolymer E) having an $[\eta]ph$ of 0.097 l/g and a melt index (at 190° C. under a load of 2160 g) of 4.6 g/10 minutes. The degree of saponification of the vinyl acetate component was 99.6 mol%.

A five-layer laminate containing copolymer E and two thermoplastic resins was produced in the same manner as in Example 1.

(1) The interlayer was made of copolymer E. Extruded at 180° to 225° C.

(2) The outer layers were made of polystyrene ("Idemitsu Styrol ET-11", a product of Idemitsu Petrochemical Co., Ltd.) having a melt index of 3 g/10 min (at 200° C. under a load of 5000 g). Extruded at 150° to 220° C.

(3) The adhesive layers were made of maleic anhydride-modified ethylene-vinyl acetate copolymer ("Merthene M-5420", a product of Toyo Soda Mfg. Co., Ltd.) having a melt index of 2 g/10 min (at 230° C. under a load of 2160 g). Extruded at 130° to 220° C. The die temperature was 220° C.

The resulting laminate sheet was made into cylindrical cups, 100 mm in inside diameter (D), 200 mm in depth (L) (the draw ratio L/D=2), 0.5 mm in wall thickness, and 1.6 liters in volume, by air-pressure forming in solid phase under the condition that heats the sheet surface to 120° C. The ratio of the thicknesses of the outer layer:adhesive layer:interlayer:adhesive layer:internal layer was 45:2.5:5:2.5:45. The properties of the cup are shown in Table 1.

For comparison, cylindrical cups were produced in the same manner as mentioned above from different materials.

In comparative example 4, the interlayer was produced from EVOH (copolymer F), which is a saponified product of ethylene-vinyl acetate copolymer containing 42.2 mol% of ethylene and 57.8 mol% of vinyl acetate. Copolymer F has an $[\eta]$ph of 0.098 l/g and a melt index of 4.8 g/10 min (at 190° C. under a load of 2160 g). The degree of saponification of the vinyl acetate component is 99.5 mol%.

In comparative example 5, the interlayer was produced from isobutene-modified EVOH (copolymer G), which is a saponified product of isobutene-ethylene-vinyl acetate copolymer containing 1.9 mol% of isobutene, 42.3 mol% of ethylene, and 55.9 mol% of vinyl acetate. Copolymer G has an $[\eta]$ph of 0.092 l/g and a melt index of 7.3 g/10 min (at 190° C. under a load of 2160 g). The degree of saponification of the vinyl acetate component is 99.4 mol%.

In comparative example 6, the interlayer was produced from EVOH (copolymer H), which is a saponified product of ethylene-vinyl acetate copolymer containing 42.2 mol% of ethylene and 57.8 mol% of vinyl acetate. Copolymer H has an $[\eta]$ph of 0.097 l/g and a melt index of 4.5 g/10 min (at 190° C. under a load of 2160 g). The degree of saponification of the vinyl acetate component is 97.2 mol%.

The properties of the cups produced in comparative examples are also shown in Table 2.

done, 28.2 mol% of ethylene, and 71.3 mol% of vinyl acetate was saponified to give a copolymer (Copolymer I) having an $[\eta]$ph of 0.127 l/g and a melt index (at 190° C. under a load of 2160 g) of 0.66 g/10 minutes. The degree of saponification of the vinyl acetate component was 99.7 mol%.

A five-layered pipe containing copolymer I and two thermoplastic resins was produced using the same extruder and the die for producing a five-layered pipe as in Example 1.

(1) The interlayer was made of copolymer I. Extruded at 190° to 235° C.

(2) The outer layers were made of polypropylene (the same one as used in Example 1). Extruded at 200° to 240° C.

(3) The adhesive layers were made of maleic anhydride-modified polypropylene (the same one as used in Example 1). Extruded at 160° to 240° C.

The die temperature was 240° C.

The resulting laminate pipe was about 1.0 mm in wall thickness, 30 mm in inside diameter, and 30 mm in length. The ratio of the thicknesses of the outer layer:adhesive layer:interlayer:adhesive layer:internal layer was 100:2:5:2:100. After heating to 160° C., the laminate pipe, with both ends thereof clamped, was stretched in the lengthwise direction and the stretched piece was pinched in a blow mold and expanded in the peripheral direction by compressed air. Thus there was obtained a biaxially oriented cylindrical blown bottle having an inside diameter of 100 mm, a height of 150 mm, an average body wall thickness of 0.6 mm, and a volume of 1180 cc. The properties of the bottle are shown in Table 3.

For comparison, cylindrical blown bottles were produced in the same manner as mentioned above from different materials.

In comparative example 7, the interlayer was produced from EVOH (copolymer J), which is a saponified product of ethylene-vinyl acetate copolymer containing 28.4 mol% of ethylene and 71.6 mol% of vinyl acetate. Copolymer J has an $[\eta]$ph of 0.128 l/g and a melt index of 1.0 g/10 min (at 200° C. under a load of 2160 g). The degree of saponification of the vinyl acetate component is 99.4 mol%.

In comparative example 8, the interlayer was produced from 1-butene-modified EVOH (copolymer K), which is a saponified product of 1-butene-ethylene-vinyl acetate copolymer containing 0.6 mol% of 1-butene, 28.1 mol% of ethylene, and 71.3 mol% of vinyl

TABLE 2

| Example | Resin for interlayer | Appearance of interlayer | | | $O_2$ permeability ($cc/m^2 \cdot 24\,h \cdot atm$) | |
|---|---|---|---|---|---|---|
| | | Clarity | Cracks | Stretching | 65% RH | 85% RH |
| Example 2 | Copolymer E | o | o | o | 0.75 | 2.4 |
| Comparative Example 4 | Copolymer F | x | x | x | 0.74 | 2.4 |
| Comparative Example 5 | Copolymer G | Δ | Δ | Δ | 1.5 | 2.9 |
| Comparative Example 6 | Copolymer H | Δ | Δ | x | 1.0 | 3.0 |

Note 1
The symbols o, Δ, and x have the same meaning as in Table 1.
Note 2
Copolymer H formed such a large amount of gel in the extruder that it was difficult to continue extrusion for more than 5 hours. Other resins permitted continuous extrusion for more than 100 hours.

EXAMPLE 3

An N-vinyl-2-pyrrolidone-ethylene-vinyl acetate copolymer composed of 0.5 mol% of N-vinyl-2-pyrroliacetate. Copolymer K has an $[\eta]$ph of 0.125 l/g and a melt index of 0.72 g/10 min (at 190° C. under a load of 2160 g). The degree of saponification of the vinyl acetate component is 99.5 mol%.

In comparative example 9, the interlayer was produced from a copolymer (copolymer L), which is a saponified product of N-vinyl-2-pyrrolidone-ethylene-vinyl acetate copolymer containing 0.6 mol% of N-vinyl-2-pyrrolidone, 28.5 mol% of ethylene, and 70.9 mol% of vinyl acetate. Copolymer L has an [η]ph of 0.181 l/g and a melt index of 0.3 g/10 min (at 230° C. under a load of 2160 g). The degree of saponification of the vinyl acetate component is 99.2 mol%. The interlayer was made at an extrusion temperature of 200° to 250° C. and a die temperature of 250° C.

The properties of the cylindrical bottles produced in the comparative examples are also shown in Table 3.

TABLE 3

| Example | Resin for interlayer | Appearance of interlayer | | | $O_2$ permeability $(cc/m^2 \cdot 24 \, h \cdot atm)$ | |
|---|---|---|---|---|---|---|
| | | Clarity | Cracks | Stretching | 65% RH | 85% RH |
| Example 3 | Copolymer I | o | o | o | 0.42 | 0.75 |
| Comparative Example 7 | Copolymer J | x | x | x | 0.63 | 1.1 |
| Comparative Example 8 | Copolymer K | Δ | Δ | x | 1.4 | 2.5 |
| Comparative Example 9 | Copolymer L | Δ | x | x | 0.53 | 0.95 |

Note 1
The symbols o, Δ, and x have the same meaning as in Table 1.
Note 2
Copolymer L formed such a large amount of gel in the extruder that it was difficult to continue extrusion for more than 3 hours. Other resins permitted continuous extrusion for more than 5 days.

EXAMPLE 4

Coinjection was carried out under the following conditions, using the same Copolymer E as in Example 2, and polyethyleneterephthalate (hereinafter referred to as PET).

A portion of the PET was injected into the parison cavity, and then while PET was injected continuously, Copolymer E was injected concentrically into said cavity. Upon completion coinjection of these polymers, first, the injection of Copolymer E was stopped, and a short time later the injection of PET was stopped. Thus, the multilayered parison comprising Copolymer E as the interlayer and PET as the inner and outer layers was obtained.

The thus obtained parison was kept at 110° C., transferred to a blow mold, and expanded by stretched rod and compressed air.

The blown bottle had a volume of 1200 cc and an average body wall thickness of 0.3 mm. The thickness of these layers was inner layer (PET) 160 μm, interlayer (Copolymer E) 40 μm, and outer layer (PET) 100 μm.

The of interlayer of said bottle exhibited good clarity without haze, no cracks at all and even stretching.

$O_2$ permeability (cc/m2.24h.atm) of said bottle was 0.47 (65% RH) and 1.5 (85% RH).

What is claimed is:

1. A laminate having good gas barrier properties which comprises at least one barrier layer of modified ethylene-vinyl alcohol copolymer and at least one layer of thermoplastic resin, said modified ethylene-vinyl alcohol copolymer being a saponified product of pyrrolidone ring containing ethylene-vinyl acetate copolymer, having a pyrrolidone ring-containing unit of 0.01 to 5 mol %, ethylene unit of 20 to 55 mol % and a degree of saponification of the vinyl acetate component of at least 98 mol %.

2. A laminate having good gas barrier properties as set forth in claim 1, wherein the pyrrolidone ring-containing unit is N-vinyl-2-pyrrolidone.

3. A laminate having good gas barrier properties as set forth in claim 1, wherein the modified ethylene-vinyl alcohol copolymer has an intrinsic viscosity of 0.07 to 0.17 l/g as measured in a mixed solvent composed of 85 wt% of phenol and 15 wt% of water at 30° C.

4. A laminate having good gas barrier properties as set forth in claim 1, wherein the thermoplastic resin is at least one member selected from the group consisting of polypropylene, polyethylene, ethylene-propylene copolymer, ethylene-vinyl acetate copolymer, thermoplastic polyester, polyamide, polystyrene, polyvinyl chloride, and polycarbonate.

5. A laminate having good gas barrier properties as set forth in claim 1, from packaging food.

* * * * *